No. 858,559. PATENTED JULY 2, 1907.
G. J. BECK.
SHAFT ATTACHMENT.
APPLICATION FILED MAY 5, 1906.
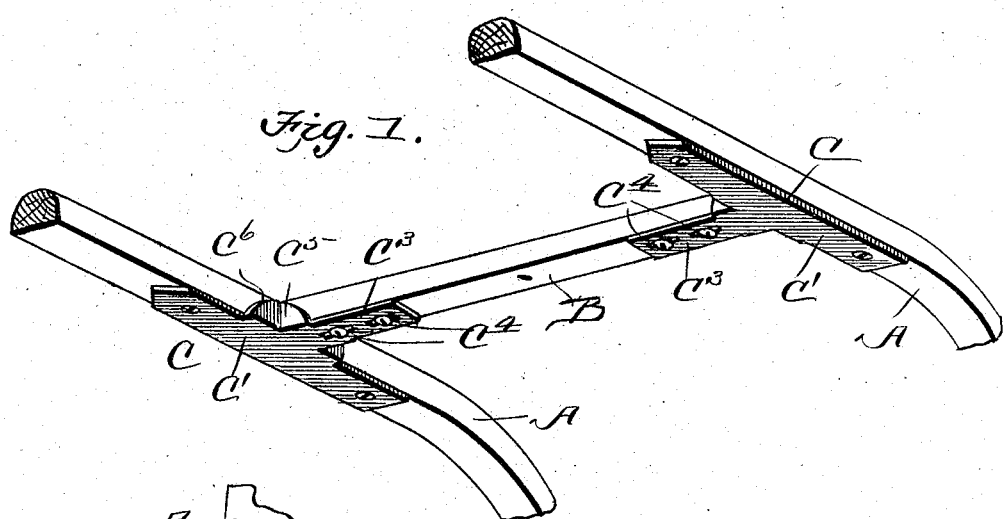
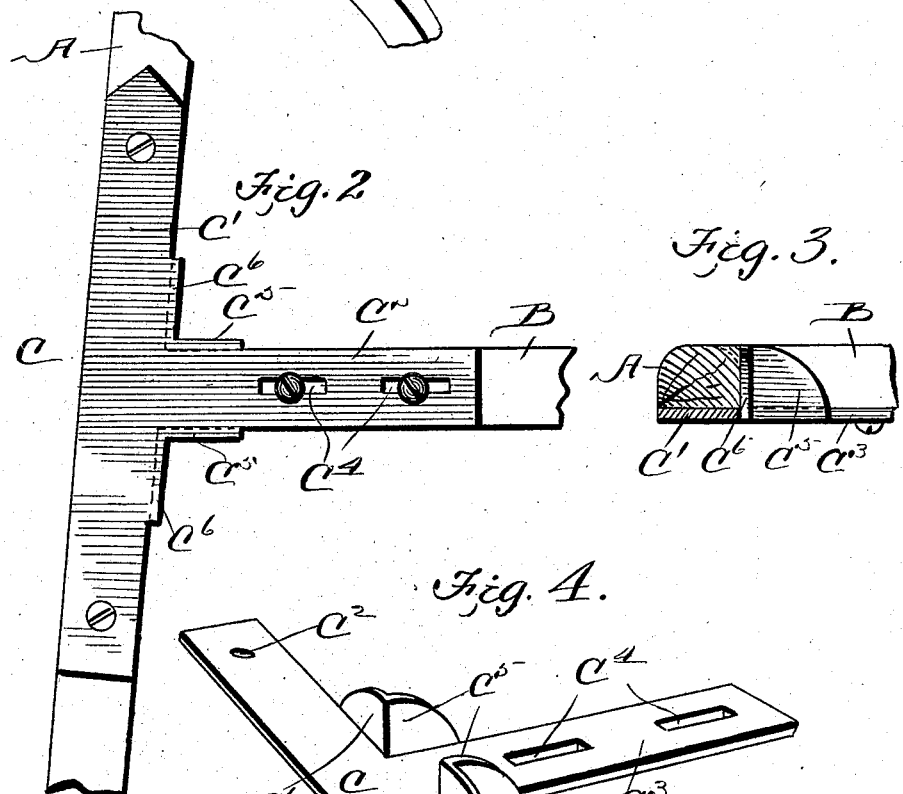
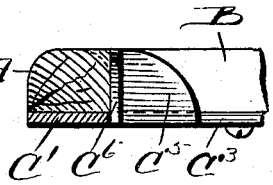
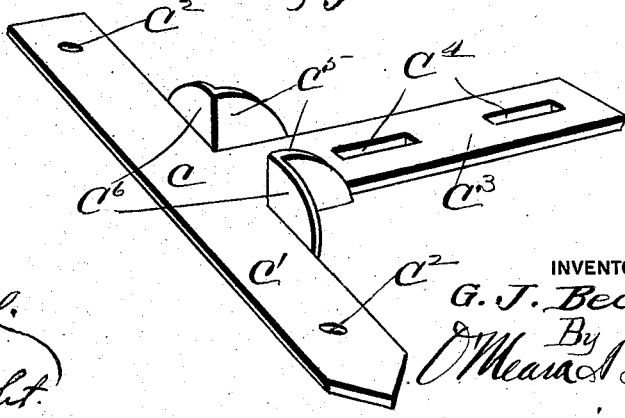
WITNESSES
INVENTOR
G. J. Beck.
ATTYS

UNITED STATES PATENT OFFICE.

GEORGE J. BECK, OF ALTON, ILLINOIS.

SHAFT ATTACHMENT.

No. 858,559.     Specification of Letters Patent.     Patented July 2, 1907.

Application filed May 5, 1906. Serial No. 315,372.

*To all whom it may concern:*

Be it known that I, GEORGE J. BECK, a citizen of the United States, residing at Alton, in the county of Madison and State of Illinois, have invented a new and useful Improvement in a Shaft Attachment, of which the following is a specification.

This invention relates to shaft attachments and more particularly to shaft couplings; the object being to provide a coupling for connecting the cross bar to the shafts, so that the shafts can be readily taken apart for shipping or other purposes.

The invention consists of the novel features of construction, combination and arrangement of parts, hereafter fully described, and pointed out in the claims.

In the drawing forming a part of this specification:— Figure 1 is a perspective view of a portion of a pair of shafts showing my improved coupling in place. Fig. 2 is a plan view of a portion of a shaft and cross bar showing my improved coupling attached. Fig. 3 is a detail sectional view. Fig. 4 is a plan view of one of my couplings detached.

In the drawings A indicates the shafts, B the cross bar and C, my improved coupling member, which is adapted to be secured in the shaft and cross bar, and connect the two together. The coupling member C, consists of a strip of metal $C'$, provided with an opening $C^2$, adjacent each end through which screws are adapted to pass, and secure it to the under side of the shaft. The strip $C'$, is provided with an outwardly extending member $C^3$, provided with spaced slots $C^4$, through which screws are adapted to pass into the cross bar and secure it thereto. The strip $C'$, is provided with flanges $C^5$, and the member $C^3$, is provided with flanges $C^6$, between which the cross beam is adapted to fit and securely hold the cross bar in a rigid position.

From the foregoing description, it will be readily seen that I have provided a coupling member so constructed that the cross bar can be easily and quickly removed as desired, so that the shafts can be folded into a bundle.

Having thus fully described my invention, what I claim as new, and desire to secure by Letters Patent is:—

A shaft coupling comprising a strip provided with openings adjacent its ends, through which screws are adapted to pass and secure it to the underside of the shaft, a member projecting optwardly from said strip provided with spaced slots through which screws are adapted to pass and secure it to the cross bar and flanges formed on the strip and members adapted to engage the cross bar, and shaft, for the purpose set forth.

GEORGE J. BECK.

Witnesses:
  WM. SWEENEY,
  B. NATHAN.